Nov. 22, 1960
A. B. STEEVER
2,961,310
COMMINUTED SOLID FUEL INTRODUCTION INTO
HIGH PRESSURE REACTION ZONE
Filed Jan. 22, 1957
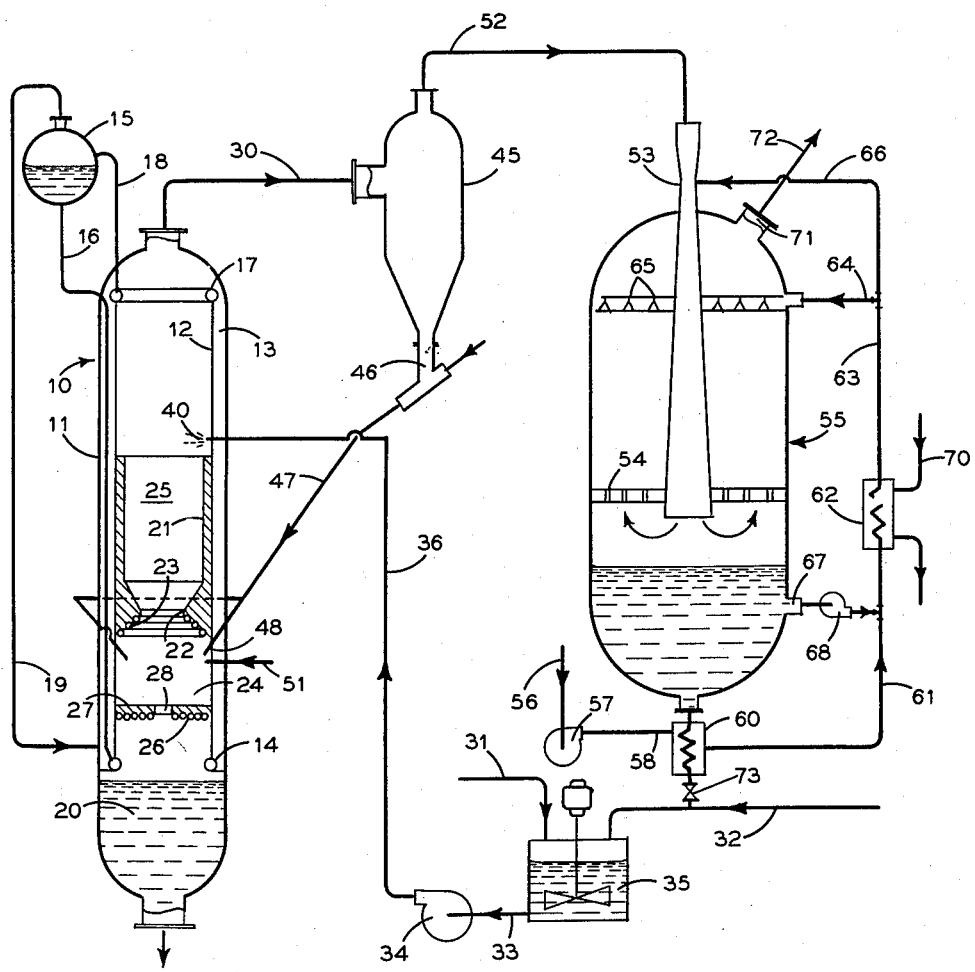
INVENTOR.
Andrew B. Steever
BY
*J. P. Moran*
ATTORNEY

United States Patent Office 2,961,310
Patented Nov. 22, 1960

2,961,310

COMMINUTED SOLID FUEL INTRODUCTION INTO HIGH PRESSURE REACTION ZONE

Andrew B. Steever, Old Greenwich, Conn., assignor to The Babcock & Wilcox Company, New York, N.Y., a corporation of New Jersey Filed Jan. 22, 1957, Ser. No. 635,234

3 Claims. (Cl. 48—206)

This invention relates to a method of and apparatus for introducing a comminuted solid fuel into a high temperature zone operating at a pressure of several atmospheres, and to a novel method of and apparatus for producing a synthesis gas at a pressure of several atmospheres by the reaction of a carbon-containing comminuted fuel, an oxygen-containing gas, and steam.

The introduction of solid fuels, particularly in the comminuted or pulverized state, into enclosures, such as furnaces or reactors, operating at a superatmospheric pressure of the order of several atmospheres presents numerous problems. In order to maintain the multiple atmosphere pressure, the entire system must be pressure sealed. While the spraying of liquid or gaseous fuels into such an enclosure does not involve any particular problem, inasmuch as these fuels may have their pressure raised to a value above the operating pressure before spraying to the system, such elevating of the pressure of a solid comminuted fuel requires complicated and expensive apparatus. For example, it has been proposed that solid comminuted fuels be supplied to a reactor or furnace operating at a pressure of several atmospheres through the medium of a complicated lock hopper system and pressurized fuel feeders. Such a system not only involves a substantial capital investment, but also requires substantial power for pressurizing the lock hoppers and conveying the fuel.

These problems are encountered more particularly in high pressure apparatus for gasifying coal in the presence of steam and an oxygen-containing gas to produce a synthesis gas at a pressure of several atmospheres.

The fundamental principles involved in reacting a carbon-containing solid fuel, such as coal, with an oxygen-containing gas (such as oxygen or air), and steam, to produce a synthesis gas comprising essentially $H_2$ and $CO$, are well-known, this reaction being customarily designated as coal gasification. Briefly, the fundamental process involves a high temperature exothermic reaction of the fuel, steam, and a quantity of oxygen-containing gas insufficient for complete combustion of the coal. The carbon and oxygen react to produce $CO_2$ which, in an endothermic reaction with the carbon particles, is substantially all converted to $CO$. The steam, by dissociation and reaction, produces $H_2$, so that the product gas is essentially $H_2$ and $CO$. This product gas may be utilized in known procedures for producing various chemical compounds.

When the synthesis gas is produced at substantially atmospheric pressure, additional equipment must be provided to raise the pressure of the synthesis gas to a higher value for subsequent processing of the gas. Such compressing equipment could be eliminated, or at least substantially reduced in size and cost, if the synthesis gas were produced at a suitable superatmospheric pressure. This could be effected by introducing all the initial reactants at such superatmospheric pressure, which would be desirable as the size and cost of equipment for raising the pressure of the initial reactants would be a fraction of the size and cost of equipment for raising the pressure of the synthesis gas produced, due to the very small volume of the initial reactants as compared with the much larger volume of the product gas.

One expedient proposed for avoiding the relatively large expense and the complications involved in providing a lock hopper system and a pressurized fuel feeder for delivering coal to such a reactor has been to mix the fuel, such as coal, with a liquid, such as water, to form a slurry which is then pumped up to a pressure in excess of the operating pressure of the gasifier or reactor. This slurry is then pumped through a tubular heat exchanger which may be separately heated or may be disposed in the reactor in the path of the hot gases. In the heat exchanger, the slurry liquid is vaporized to steam by heat transfer from the hot gases, and the coal is fed into the reactor in suspension in the high pressure steam.

It may be further noted that all coal gasifiers producing synthesis gas include means for rapidly reducing the temperature of the effluent gas to a low value in order to arrest any tendency for the constituents of the synthesis gas to react with each other back to their initial state.

In accordance with the present invention, an improved method and apparatus are provided for utilizing a pressurized fuel slurry feed to deliver the fuel into a reaction zone, such as a furnace or gasifier, at a pressure in excess of the operating pressure of several atmospheres in the reaction zone. Specifically, and in its broadest aspects, the invention comprises mixing the fuel, such as coal, with a liquid, such as water, to form a slurry, pumping this slurry to a pressure in excess of the operating pressure of the reaction zone, spraying the slurry into the reaction zone in the path of the hot gases flowing therethrough to vaporize the slurry liquid and to cool the hot gases, and separating the fuel, in the pressurized system, from the vapors and gases.

As applied to the production of synthesis gas, the slurry liquid is water which is vaporized into steam by the hot synthesis gas. This vaporization also effects a rapid quenching of the effluent synthesis gas to a low temperature sufficient to inhibit reverse reaction of the synthesis gas constituents. The fuel, in its original comminuted form, and in suspension in the synthesis gas, is carried to a separator means which separates the gas from the fuel. The synthesis gas is drawn off and passed through a wet scrubber to remove all solids therefrom, after which the clean synthesis gas is drawn off for further processing to form various chemical compounds.

The separated fuel from the separator means is fed into an aspirator supplied with reaction steam, or any other gaseous reaction medium at a pressure in excess of the pressure of the reaction zone, and the fuel in suspension in the steam or other gaseous medium, is reintroduced into the reaction zone, for admixture with oxygen or an oxygen-containing gas delivered under pressure to the reaction zone in an amount insufficient for complete combustion of the fuel. In a preferred embodiment of the invention, a two zone gasifying arrangement is used in which a preponderantly exothermic reaction of the fuel and oxygen occurs in a primary zone to raise the temperature of the reactants to a value which is an optimum for the subsequent endothermic reaction of the reactants. The high temperature reactants flow into and through a secondary zone wherein a preponderantly endothermic gas reaction occurs. The high temperature gases leaving the secondary zone are subjected to the spray of the coal slurry, to quench the synthesis gas and to vaporize the slurry liquid.

For an understanding of the invention principles, reference is made to the following description of a typical embodiment thereof as illustrated in the accompanying drawing, in which the single figure is a partial schematic and partial vertical sectional view of a synthesis gas producing installation incorporating the inventon.

Referring to the drawing, the apparatus therein illustrated includes a synthesis gas generator 10 designed for operation at a pressure of several atmospheres. The gasifier or generator internals may be essentially of the type described and claimed in the copending application of P. R. Grossman et al., Serial No. 225,346, filed May 9, 1951, and now U.S. Patent 2,801,158 for "Method of and Apparatus for Gasification of Pulverized Coal." For high pressure operation, the generator may be provided with water wall protection in the same manner as shown and described in the copending application of T. S. Sprague, Serial No. 637,133, filed January 30, 1957 for Internal Steam Annulus Within Pressure Shell for Hydrocarbon Reactor.

More particularly, generator 10 is arranged to effect gasification of a carbon-containing comminuted fuel in two stages. For this purpose, generator 10 includes a sealed outer casing 11 within which is an upright circular row of water wall steam generating tubes 12 spaced from casing 11 to form an annular space 13. The lower ends of the circular row of tubes 12 are connected into an annular header 14 which, through the medium of one or more downcomers 16, receives liquid, such as water, from a vapor generator drum 15. The steam generated in the circular row of tubes 12 is collected in an annular header 17 connected to the upper ends of the tubes and delivering the steam through a line 18 to the vapor space of drum 15. The space 13 between outer casing 11 and water wall 12 is supplied with steam at saturation temperatures by means of an annulus equalizing steam line 19, the steam pressure being selected to be of such a value that the pressure is equalized on both sides of water wall 12. This steam flows upwardly through space 13 and out through the effluent outlet along with the synthesis gas. The tubes forming the water wall 12 are integrally connected or otherwise arranged to form a sealed closure.

Beneath annulus 14 is a slag receiving and quenching container 20, preferably filled with liquid into which the molten slag falls and is chilled for later removal. Suitable pressure-sealed slag let-down means (not shown) are connected to the outlet of container 20. Substantially intermediate the height of the generator, a refractory lining 21 is provided on the water wall, this lining being so constructed as to provide a restricted throat 22 near its lower end supported on a conical row of tubes 23, which may be used to generate steam or may be merely for the flow of cooling fluid. Throat 22 divides the reaction space into a primary zone 24 and a secondary zone 25.

A bottom slag outlet is provided by a flat circular coil of tubes 26 on the upper side of which is a layer of refractory 27. The slag flowing through the throat 28 falls into the cooling liquid in the slag quenching chamber 20.

In general operation of synthesis gas generator 10, a comminuted carbon-containing fuel in admixture with steam is delivered under pressure to primary zone 24 for admixture therein with an oxygen-containing gas, also delivered under pressure to primary zone 24, but in an amount less than that needed for complete combustion of the fuel. A preponderantly exothermic reaction of the oxygen and fuel occurs in chamber 24, raising the temperature of the reactants to a value, such as 3200° F., which is an optimum value for the subsequent endothermic reaction of the steam, $CO_2$, and any unburned carbon to form $H_2$ and CO. The hot gaseous products of the preponderantly exothermic reaction, including any unburned fuel particles, flow through throat 22 into and through secondary zone 25, wherein the reaction is preponderantly endothermic, substantially completely gasifying the carbon particles. The synthesis gas, which is a mixture composed mainly of $H_2$ and CO, flows out through the top of the generator 10 into an outlet line 30.

In accordance with the invention, the carbon-containing fuel in a comminuted form is delivered to the generator 10 at a pressure in excess of the operating pressure of several atmospheres within the generator 10. The comminuted fuel, from a pulverizer or the like, flows through a line 31 to a mixer 35 wherein the fuel is mixed with water, or other suitable liquid, supplied through a line 32. In a preferred arrangement, and solely by way of example, 1.4 pounds of water may be used for each pound of coal.

The resultant slurry containing the fuel is delivered from mixer 35 through a line 33 to a pump 34 where the pressure of the slurry is raised to a value in excess of the operating pressure within generator 10. Pump 34 delivers the high pressure slurry to a feed line 36 which extends through casing 11 and water wall 12 and terminates in a spray nozzle 40. The slurry is sprayed into the generator 10, preferably above the upper end of the refractory lining 21 of secondary reaction zone 25. The spray cools the synthesis gas to a temperature of approximately 500° F. at the exit of the generator. At the same time, the hot synthesis gas vaporizes the slurry liquid with the vapor passing off through line 30 along with the effluent gas.

The synthesis gas, vapor, and the comminuted fuel from which the slurry liquid has thus been evaporated flow through line 30 to a suitable separating means, such as a cyclone separator 45. In cyclone separator 45, the comminuted fuel is separated from the synthesis gas and any vapor, and flows downwardly into an aspirator 46 to which reaction steam, or any other gaseous reaction medium, is supplied at a pressure in excess of the operating pressure within generator 20. The comminuted fuel, in suspension in the high pressure steam or other gaseous medium, is delivered through a line 47 to burners 48 located beneath throat 22. At the exit of burners 48, oxygen, or an oxygen-containing gas, from a line 51, is delivered into the primary zone 24 for admixture with the fuel and steam mixture. The aforementioned 2-stage reaction between the oxygen and steam then occurs. Meanwhile, the synthesis gas from cyclone separator 45 flows through a line 52 to a scrubber generally indicated at 55.

Schrubber 55 may be of the type shown and described in my copending application Serial No. 749,999 filed July 21, 1958 for High Pressure Pulverized Coal Gasifier. As shown, this is a wet scrubber in which the synthesis gas enters through a venturi scrubber 53 which directs the synthesis gas downwardly through the scrubber for return flow upwardly through a perforated support 54 on which are a plurality of Raschig rings. These rings facilitate thorough contact of the synthesis gas with water flowing downwardly through the bed of rings.

The circulating water for scrubber 55 is provided in the following manner. A make-up line 56 delivers water from a suitable source to a pump 57 which delivers the water through line 58 to a heat exchanger 60. Water from heat exchanger 60 is delivered through a line 61 to a second heat exchanger 62, from which the water flows into a line 63. Part of the water from line 63 is delivered by a branch line 64 into scrubber 55 where it is fed to a spray arrangement 65 which directs the water through the Raschig ring section. The remainder of the water is delivered through a line 66 to the venturi scrubber 53. Most of the water passing through the scrubber flows through an outlet 67 to a circulating pump 68 delivering the water to line 61 or line 63, either before or after heat exchanger 62.

Heat exchangers 60 and 62 elevate the scrubbing water temperature to a value sufficient to inhibit condensation of the steam flowing through the effluent line, separator means, and scrubber along with the synthesis gas. This steam is thereby conserved for possible use in later processing of the synthesis gas.

Heat exchanger 62 is supplied with saturated steam at 450 p.s.i.g. by means of a line 70, this steam being returned to re-heating means for reuse. This steam is supplied at a pressure, such as 450 p.s.i.g., substantially equal to that in reactor 10, so that its saturation temperature is sufficiently high to raise the temperature of the scrubbing water to at least above the dew point of the synthesis gas flowing through the scrubber. The blowdown water from scrubber 55, containing fuel particles scrubbed from the gas, flows through the heat exchanger 60 wherein it gives up heat to the water flowing to line 61, and then the blowdown water is delivered through a valve 73 to the line 32 feeding the slurry water to mixer 35. Any unreacted fuel is thus re-cycled. The cleaned synthesis gas is discharged through outlet 71 into a line 72 leading to further processing apparatus.

The softening temperature of the coal is above the dew point of the synthesis gas and vapor. Hence, in order to avoid both condensation in the apparatus and formation of deposits therein due to heating of the coal, the temperature at the effluent outlet of reactor 10 is maintained at a value intermediate such dew point and softening temperature.

Summarizing the operation of the apparatus, a slurry of water and comminuted fuel, at a pressure in excess of the operating pressure of the reactor, is sprayed into the reactor where the hot gases and high temperatures involved effect a vaporizing of the slurry liquid. The fuel in suspension with the vapor and the gas is then drawn to a separator where the fuel is separated from its carrier. The synthesis gas is drawn off from the separator and through a scrubber to remove solid particles therefrom. The now dry fuel, under the pressure existing in the reactor, may be stored or may be re-fed to a steam aspirator by means of which the fuel may be returned to the reaction zone for combustion to provide the reaction heat.

The invention thus not only provides a novel method and apparatus for introducing a comminuted fuel into a reaction zone operating at a pressure of several atmospheres, but also provides a novel and practical arrangement for producing synthesis gas, by the gasification of a carbon-containing fuel in the presence of an oxygen-containing gas and steam, at a pressure of several atmospheres. This eliminates the necessity for an expensive capital investment for the equipment for raising the pressure of the entering reactants to a value suitable for later processing of the synthesis gas into various chemical compounds. In addition, the slurry spray acts as a quench for the synthesis gas.

The water scrubbing of the synthesis gas may be effected by means other than the wet scrubber 55. For example, the synthesis gas may be passed through a pair of cyclone separators in series, each of these separators having a water and gas inlet in the form of a venturi scrubber similar to venturi scrubber 53. In such arrangement, the clean scrubbing water is circulated first to the venturi scrubber inlet of the trailing cyclone separator, where the clean water scrubs the cleaner gas. The water and any unreacted fuel and ash particles are separated from the gas in the trailing separator, with the gas exiting to further processing apparatus. The water and any solids are drawn from a bottom outlet of the trailing separator and circulated to the venturi scrubber inlet for the leading cyclone separator to scrub the gas entering from the line 52. The blowdown from the bottom outlet off the leading separator is returned, through suitable control valve means to water line 32 leading to mixer 35 or may be discarded.

In this arrangement, the clean water entering the venturi scrubber inlet for the trailing separator is passed through a first heat exchanger where it extracts heat from the blowdown water from the leading separator, and then through a second heat exchanger, similar to heat exchanger 62, where the clean water is further heated by extracting heat from steam supplied to this second heat exchanger.

While a specific embodiment of the invention has been shown and described in detail to illustrate the application of the invention principles, it will be understood that the invention may be embodied otherwise without departing from such principles.

What is claimed is:

1. The method of producing a synthesis gas by the high temperature and high pressure reaction of an oxygen-containing gas, a carbon-containing solid and steam which comprises mixing particle-form carbon-containing solids with water to form a slurry, spraying said slurry in liquid form into a quench zone receiving the gaseous products of reaction from an endothermic reaction zone which receives gases from an exothermic reaction zone so as to quench the reaction gases by vaporization of the slurry liquid and to thus cool the gaseous products of reaction, withdrawing the solids in suspension in the synthesis gas and vapor from the quench zone, separating the solids from the synthesis gas and vapor, discharging the separated solids into said exothermic reaction zone in admixture with oxygen-containing gas in an amount less than that required for complete combustion of the solids, effecting in the reaction zone a preponderantly exothermic reaction of the carbon-containing solids and oxygen-containing gas to elevate the temperature of the reactants to a value within the optimum temperature range for the endothermic reaction of the products of such preponderantly exothermic reaction and providing sufficient steam in said last named products to cause endothermic reaction in said endothermic reaction zone, and continuously withdrawing the gaseous products of such reactions and any unreacted solid particles from such reaction zone through such quench zone.

2. The method of producing a synthesis gas by the high temperature and high pressure reaction of an oxygen-containing gas, a carbon-containing solid and steam which comprises mixing particle-form carbon-containing solids with water to form a slurry, spraying said slurry in liquid form with substantially all of the original water retained therein into a quench zone receiving the gaseous products of reaction from an endothermic reaction zone which receives gases from an exothermic reaction zone so as to quench the reaction gases by vaporization of the slurry liquid and to thus cool the gaseous products of reaction, withdrawing the solids in suspension in the synthesis gas and vapor from the quench zone, separating the solids from the synthesis gas and vapor, discharging the separated solids into said exothermic reaction zone in admixture with oxygen-containing gas in an amount less than that required for complete combustion of the solids, effecting in the reaction zone a preponderantly exothermic reaction of the carbon-containing solids and oxygen-containing gas to elevate the temperature of the reactants to a value within the optimum temperature range for the endothermic reaction of the products of such preponderantly exothermic reaction and providing sufficient steam in said last named products to cause endothermic reaction in said endothermic reaction zone, withdrawing non-combustible constituents of said solids from said reaction zone in the form of molten slag, and continuously withdrawing the gaseous products of such reactions and any unreacted solid particles from such reaction zone through such quench zone.

3. The method of producing a synthesis gas by the high temperature and high pressure reaction of an oxygen-containing gas, a carbon-containing solid and steam which comprises mixing particle-form carbon-containing solids with water to form a slurry, spraying said slurry in liquid form into a quench zone receiving the gaseous products of reaction from an endothermic reaction zone which receives gases from an exothermic reaction zone so as to quench the reaction gases by vaporization of the slurry liquid and to thus cool the gaseous products of reaction, withdrawing the solids in suspension in the synthesis gas and vapor from the quench zone, separating the solids from the synthesis gas and vapor in a dry separating zone, washing the synthesis gas and vapor in a wet cleaning zone to remove substantially all of the solids from said synthesis gas, returning said solids in wash liquid from said wet cleaning zone to be mixed with said slurry, discharging the separated solids from said dry separating zone into said exothermic reaction zone in admixture with oxygen-containing gas in an amount less than that required for complete combustion of the solids, effecting in the reaction zone a preponderantly exothermic reaction of the carbon-containing solids and oxygen-containing gas to elevate the temperature of the reactants to a value within the optimum temperature range for the endothermic reaction of the products of such preponderantly exothermic reaction and providing sufficient steam in said last named products to cause endothermic reaction in said endothermic reaction zone, and continuously withdrawing the gaseous products of such reactions and any unreacted solid particles from such reaction zone through such quench zone.

References Cited in the file of this patent

UNITED STATES PATENTS

| | | |
|---|---|---|
| 2,560,807 | Lobo | July 17, 1951 |
| 2,639,982 | Kalbach | May 26, 1953 |
| 2,677,603 | Van Loon | May 4, 1954 |
| 2,687,950 | Kalbach | Aug. 31, 1954 |
| 2,698,227 | Peery et al. | Dec. 28, 1954 |

FOREIGN PATENTS

| | | |
|---|---|---|
| 459,044 | Italy | Aug. 23, 1950 |
| 688,915 | Great Britain | Mar. 18, 1953 |
| 1,073,105 | France | Mar. 17, 1954 |
| 156,950 | Australia | June 8, 1954 |